United States Patent Office 3,534,046
Patented Oct. 13, 1970

3,534,046
CYCLOPENTYL DERIVATIVES OF SUBSTITUTED QUINOLIZINES
Robert I. Meltzer, Rockaway, and Richard E. Brown, Hanover, N.J., assignors to Warner-Lambert Pharmaceutical Company, Morris Plains, N.J., a corporation of Delaware
No Drawing. Filed Jan. 22, 1968, Ser. No. 699,298
Int. Cl. C07d 101/00
U.S. Cl. 260—289                              2 Claims

ABSTRACT OF THE DISCLOSURE

A water soluble estrogenic compound of the formula:

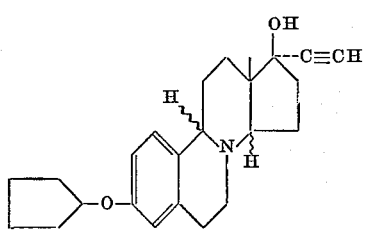

This compound is prepared by treating a compound of the formula

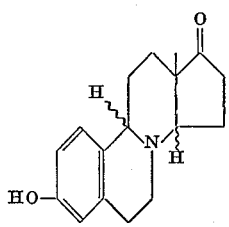

with a cyclopentyl halide in an inert solvent in the presence of an alkali metal alkoxide. The resulting product thus produced is then ethynylated.

This compound has estrogenic-like properties and has the added advantage that it is water soluble.

---

The present invention relates to cyclopentyl derivatives of substituted quinolizines of the formula:

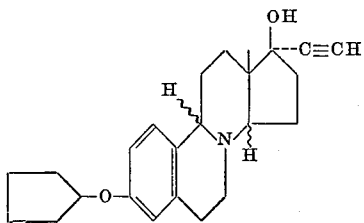

This invention also includes within its scope novel intermediates for the production of said cyclopentyl derivatives of substituted quinolizine, as well as acid addition salts and quaternary ammonium salts thereof.

The novel compounds of this invention exhibit estrogenic-like properties in a mammalian host. Accordingly, they are useful whenever estrogen is indicated. Because these compounds are long acting, the dosage requirements are generally less than is needed in conventional estrogen therapy. Broadly speaking, a dose of about 0.1 to 25 mg. is administered orally or by injection to a mammal such as dogs, cats, and the like to produce the desired estrogenic effects. They are useful to treat conditions where estrogen like compounds are indicated but at a lower dose, e.g., menopause, dysmenorrhea, functional uterine bleeding, and senile vaginitis, etc. In use, they are combined with a pharmaceutically acceptable excipient such as lactose, mannitol, starch, terra alba, and the like, to form dosage forms such as tablets, capsules, and the like. It may also be suspended or dissolved in parenterally acceptable vehicles such as peanut oil, water and the like, to form dosage forms suitable for parenteral administration. This dosage regimen of 0.1 to 25 mg. may be repeated several times daily or until the desired estrogenic effects are obtained. This dosage regimen, of course, may be varied according to age, sex and the severity of the condition being treated.

According to the present invention, the above compound is obtained by treating a compound of the formula,

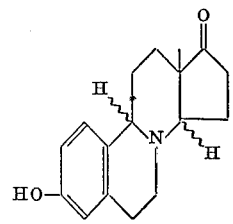

preferably its hydrobromide acid addition salt, with an alkali metal alkoxide, for example, sodium or potassium methoxide. Then the resulting product is treated with a cyclopentyl halide, for example, cyclopentyl bromide, to obtain an intermediate of the formula:

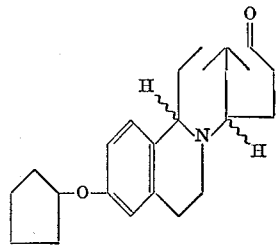

The reaction is generally effected in an anhydrous lower molecular weight alcohol, for example, methanol or ethanol. The intermediate thus obtained is then treated with an ethynylating agent, such as lithium acetylide-ethylenediamine. The reaction may be effected in a suitable solvent such as dimethyl sulfoxide at a temperature range of about 20–30° C. The reaction product may be recovered utilizing conventional crystallization techniques.

The starting compound is obtained according to our teachings in our copending U.S. patent application, Ser. No. 248,872 filed Jan. 2, 1963, now U.S. 3,341,543 granted Sept. 12, 1967.

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric, and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate, or methyl p-toluene sulfonate.

The following examples are included in order to further illustrate this invention.

EXAMPLE 1

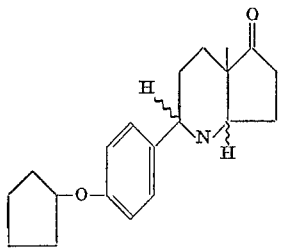

3,3a,5,6,10b,11,12,12a-octahydro - 8-cyclopentyloxy-12a-methylbenzo[a]cyclopenta[f]quinolizin-1(2H)-one To a mixture of 5.0 g. of 3,3a,5,6,10b,11,12,12a-octahydro-8-hydroxy - 12a - methylbenzo[a]cyclopenta[f]quinolizin-1(2H)-one hydrobromide in 38 ml. of anhydrous ethanol is added 3.0 g. of sodium methoxide powder. After stirring for 30 minutes at 40° C., 3.85 g. of cyclopentylbromide is added in one portion and the mixture stirred at reflux for four hours. The ethanol is removed under vacuum at 30° and the residue partitioned between water and ether. The ether extracts are washed with water, dried and concentrated to give 3,3a,5,6,10b,11,12,12a-octahydro-8-cyclopentyloxy - 12a-methylbenzo[a]cyclopenta[f]quinolizin-1(2H)-one as a tan solid, M.P. 139–42° C. The recrystallized product from acetone/water melts at 145–146° C.

EXAMPLE 2

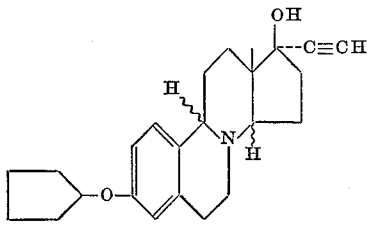

8-(cyclopentyloxy)-1-ethynyl - 1,2,3,3a,5,6,10b,11,12,12a, decahydro - 12a - methylbenzo[a]cyclopenta[f]quinolizine-1-ol To a suspension of 15 g. of lithium acetylide-ethylenediamine complex in 200 ml. of dry DMSO was added 5 g. of 3,3a,5,6,10b,11,12,12a-octahydro-8-cyclopentyloxy - 12a - methylbenzo[a]cyclopenta[f]quinolizine - 1 [2H]-one, and the mixture stirred for 5 hours at room temperature. The reaction mixture was cautiously poured into 500 ml. of ice water, and the precipitated oil was extracted with ether. The ether phase was washed with water, dried and concentrated to give 5 g. of gum. This was placed on 400 g. of alumina, and the column washed with 1 liter of benzene. Elution with anhydrous ether removed 1.3 g. of starting ketone. Elution with USP ether gave an oil which crystallized. Recrystallization from isopropyl ether gave crystals, M.P. 83–5°.

It is understood that the foregoing examples are given merely by way of illustration and that many variations may be made therein without departing from the spirit of our invention.

Having described our invention, what we desire to secured by Letters Patent is:

1. A compound of the formula:

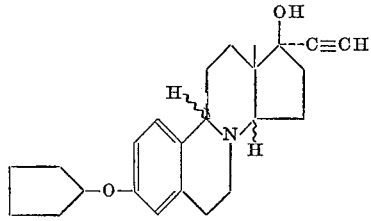

and its pharmaceutically aceptable acid addition salts.

2. A compound of the formula:

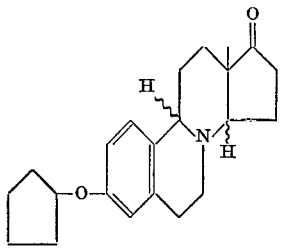

References Cited
UNITED STATES PATENTS 3,290,314   12/1966   Clarkson _____ 260—286

DONALD G. DAVIS, Primary Examiner

U.S. Cl. X.R.

260—286, 648; 424—258